United States Patent
Clinchant

(10) Patent No.: US 9,460,197 B2
(45) Date of Patent: Oct. 4, 2016

(54) MEASURING INFORMATIVE CONTENT OF WORDS IN DOCUMENTS IN A DOCUMENT COLLECTION RELATIVE TO A PROBABILITY FUNCTION INCLUDING A CONCAVITY CONTROL PARAMETER

(75) Inventor: Stephane Clinchant, Grenoble (FR)

(73) Assignee: Xerox Corporation, Norwalk, CT (US)

( * ) Notice: Subject to any disclaimer, the term of this patent is extended or adjusted under 35 U.S.C. 154(b) by 94 days.

(21) Appl. No.: 13/463,346

(22) Filed: May 3, 2012

(65) Prior Publication Data

US 2013/0297622 A1    Nov. 7, 2013

(51) Int. Cl.
    *G06F 17/30* (2006.01)
(52) U.S. Cl.
    CPC ... *G06F 17/30687* (2013.01); *G06F 17/30011* (2013.01)
(58) Field of Classification Search
    CPC .................. G06F 17/30864; G06F 17/30011; G06F 17/30867; G06F 17/30699; G06F 17/30705
    USPC .................................................. 707/739, 750
    See application file for complete search history.

(56) References Cited

U.S. PATENT DOCUMENTS

| 2002/0107853 | A1* | 8/2002 | Hofmann et al. | 707/7 |
| 2011/0010176 | A1* | 1/2011 | Yoshiike et al. | 704/256.2 |
| 2011/0016117 | A1* | 1/2011 | Edala et al. | 707/729 |

OTHER PUBLICATIONS

Mandelbrot, Benoit B. "'New Methods of Statistical Economics,' revisited: Short versus long tails and Gaussian versus power-law distributions."Complexity 14.3 (2009): 55-65.*
Clinchant, Stéphane, and Éric Gaussier. "Retrieval constraints and word frequency distributions a log-logistic model for IR." Information Retrieval 14.1 (2011): 5-25.*
G. Amati and C. J. V. Rijsbergen. Probabilistic models of information retrieval based on measuring the divergence from randomness. *ACM Trans.Inf. Syst.*, 20(4):357{389, 2002.
S. Clinchant and E. Gaussier. Information-based models for ad hoc IR. In *Proceeding of the 33rd international ACM SIGIR conference on Research and development in information retrieval*, SIGIR '10, pp. 234{241, New York, NY, USA, 2010. ACM.
S. Deerwester. Improving Information Retrieval with Latent Semantic Indexing. In C. L. Borgman and E. Y. H. Pai, editors, *Proceedings of the 51st ASIS Annual Meeting (ASIS '88)*, vol. 25, Atlanta, Georgia, Oct. 1988. American Society for Information Science.
S. Deerwester, S.T. Tumais, T.K. Landauer, G.W. Furnas, R.A. Harshman "Indexing by latent semantic analysis", J. Soc. Inform. Sci., 41 (1990), pp. 391-407.
S. Dumais, et al., "Using Latent Semantic Analysis to Improve Access to Textual Information", CHI '88 Proceedings of the SIGCHI conference on Human factors in computing systems ACM New York, NY, USA © 1988

(Continued)

*Primary Examiner* — Nan Hutton
(74) *Attorney, Agent, or Firm* — Fay Sharpe LLP

(57) ABSTRACT

Processing methods and systems are provided for representing documents relative to importance of words in the document. A processor comprising a weighting model of word importance in a document in a collection relative to an importance of the word in other documents in the collection computes a deviation of distribution of the word from a probability distribution of the word in other documents in the collection, where the deviation distribution is weighted in accordance with a concavity control function. A concavity control parameter is adjustable relative to word frequency.

8 Claims, 2 Drawing Sheets

(56) References Cited

OTHER PUBLICATIONS

S. P. Harter. A probabilistic approach to automatic keyword indexing. *Journal of the American Society for Information Science*, 26, 1975.

J. Naudts. The q -exponential family in statistical physics. *Journal of Physics: Conference Series*, 201(1):012003, 2010.

P. Ogilvie and J. P. Callan. Experiments Using the Lemur Toolkit. In *Text REtrieval Conference*, 2001.

S. E. Robertson and S. Walker. Some simple effective approximations to the 2-poisson model for probabilistic weighted retrieval. In *SIGIR '94: Proceedings of the 17th annual international ACM SIGIR conference on Research and development in information retrieval*, pp. 232-241, New York, NY, USA, 1994. Springer-Verlag New York, Inc.

C. Zhai and J. Lafferty. A study of smoothing methods for language models applied to information retrieval. *ACM Trans. Inf. Syst.*, 22(2)179{214, 2004.

D. Zhang, X. Chen, and W. S. Lee. Text classification with kernels on the multinomial manifold. In *Proceedings of the 28th annual international ACM SIGIR conference on Research and development in information retrieval*, SIGIR '05, pp. 266{273, New York, NY, USA, 2005. ACM.

\* cited by examiner

MEASURING INFORMATIVE CONTENT OF WORDS IN DOCUMENTS IN A DOCUMENT COLLECTION RELATIVE TO A PROBABILITY FUNCTION INCLUDING A CONCAVITY CONTROL PARAMETER

BACKGROUND

Many tasks such as Information Retrieval, Clustering and Categorization represent documents by vectors, where each dimension index of a document can represent a given word and where a value can encode the word importance in the document. The field of the subject embodiments relate to a representation of documents by the relative importance of a word in a document and to a particular weighting model relative to term frequencies in an associated collection. More particularly, the embodiments relate to weighting the measure of relative importance using a concavity control parameter.

Many weighting models try to quantify the importance of a word in a document with probabilistic measures. For each term in the collection, a probability distribution is associated to the term. For any word in any document, a probability according to the collection model can then be computed. The computed probability is related to the informative content of the word in the document or document collection (corpus).

The main hypothesis of many weighting models is the following: The more the distribution of a word in a document deviates from its average distribution in the collection, the more likely is this word significant for the document considered. This can be easily captured in terms of Shannon information. Let $X_\omega$ the random variable of frequencies of word $\omega$ and P a probability distribution with parameter $\lambda_\omega$, then the Shannon information measure is:

$$\text{Info } P(X_w = x) = -\log P(X = x_w | \lambda_w) = \text{InformativeContent} \quad (1)$$

If a word behaves in the document as expected in the collection, then it has a high probability of $P(X=x_\omega|\lambda_\omega)$ occurrence in the document, according to the collection distribution, and the information it brings to the document, $-\log P(X=x_\omega|\lambda_\omega)$, is small. On the contrary, if it has a low probability of occurrence in the document, according to the collection distribution, then the amount of information it conveys is greater This is the idea underpinning the classical Divergence From Randomness Model and information-based models in Information Retrieval.

Hence, the cornerstone of many weighting models consists in using Shannon information $-\log P(X_\omega|\lambda_\omega)$ to measure the importance of a word in a document and weighting of words in documents.

Table 1 identifies many of the notations used in the remainder of this disclosure.

TABLE 1

Notations

| Notation | Description |
| --- | --- |
| q, d | Original query, document |
| RSV (q, d) | Retrieval status value of d for q (ie Ranking Function) |
| $x_{wd}$ | # of occurrences of w in doc d |
| $X_w$ | Discrete Random Variable for the $x_{wd}$ |
| $T_w$ | Continuous Random Variable for normalized occurrences |
| $l_d$ | Length of doc d |
| avgl | Average document length in collection |
| N | # of docs in collection |
| $N_w$ | # of documents containing w |

TABLE 1-continued

Notations

| Notation | Description |
| --- | --- |
| idf (w) | $-\log(N_w/N)$ |
| P(w|C) | Probability of the word in the collection |

A known notion to define the family of IR models is the following equation:

$$RSV(q,d) = \Sigma_{w \in q} -q_w \log P(T_w \geq t_{wd}|\lambda_w) \quad (2)$$

where $T_w$ is a continuous random variable modeling normalized term frequencies and $\lambda_w$ is a set of parameters of the probability distribution considered. This ranking function corresponds to the mean information a document brings to a query or, equivalently, to the average of the document information brought by each query term a.

Few words are needed to explain the choice of the probability $P(T_w \geq t_{wd})$ in the information measure. Shannon information was originally defined on discrete probability and the information quantity from the observation of x was measured with $-\log P(X=x|\Theta)$. As the normalized frequencies $t_{wd}$ are continuous variables, Shannon information cannot be directly applied.

A known solution is to measure information on a probability of the form $P((t_{wd}-a-T_w-t_{wd}+b|\lambda_w)$. However, one has to choose values for a and b, and a=0 and b=+∞ have been chosen for theorical reasons. The mean frequency of most words in a document is close to 0. For any word large frequencies are typically less likely than smaller frequencies on average. The larger the term frequency is, the smaller $P(T_w \geq t_{wd})$ is and the bigger $-\log P(T_w \geq t_{wd})$. Hence, the use of the survival function P(T>t) seems compatible with the notion of information content discussed above.

Overall, the general idea of the information-based family is the following:

1. Due to different document length, discrete term frequencies (x) are renormalized into continuous values (t(x))

2. For each term w, one can assume that those renormalized values follow a probability distribution P on the corpus. Formally, $T_w:P(.|\lambda_w)$.

3. Queries and documents are compared through a measure of surprise, or a mean of information of the form $$RSV(q,d) = \sum_{w \in q} -q_w \log P(T_w \geq t(x)|\lambda_w)$$

So information models are specified by two main components: a function which normalizes term frequencies across documents, and a probability distribution modeling the normalized term frequencies. Information is the key ingredient of such models since information measures the significance of a word in a document.

Such known information models measure the relative importance of a word in a document compared to its importance in other documents in the collection by either a fixed weighting function (natural log) or the proposition of ad-hoc classes (which do not focus on concavity control).

There is always a need for new and improved representation of documents which can yield better results than known representations in document retrieval, categorization and clustering tasks. The subject embodiments address this need.

SUMMARY OF THE PREFERRED EMBODIMENTS

The subject embodiments relate to the use of a generalized algorithmic function including a concavity control parameter to measure the importance of words in documents.

In one preferred embodiment a method is provided for document representation by measuring informative content of words comprising associating a probability distribution for a plurality of words in a document collection;

forming a weighting model of word importance to the collection from the probability distribution therein;

determining a distribution of a selected word in a particular document in the collection;

computing a deviation of distribution of the selected word in the document from the probability distribution of the word in the collection in accordance with a concavity function; and assigning a greater importance of the selected word to the informative content of the document by the greater the computed deviation whereby the document can be represented relative to the collection by the assigned importance of a plurality of selected words.

DETAILED DESCRIPTION

The preferred embodiments use a generalized logarithmic function including a concavity control parameter to measure informative contents of documents.

Instead of measuring informative content with a fixed valued log function $-\log P(T>t)$, the subject embodiments measure the informative content of a word in a document with a variable concavity control parameter function, $-\log_\eta P(T>t)$, where i sets curvature of the logarithm.

So, the feature vector of a document can be seen as:

$$\phi(d) = (-\log_\eta P(T_{w1}|\lambda_1), \ldots, -\log_\eta P(T_M|\lambda_M)) \quad (5)$$

The $\eta$-logarithm [5] comes from the statistical physics community and can be understood as a generalization of the logarithm function. The $\eta$-logarithm is defined by $\forall t > 0$:

$$\ln_\eta(t) = \frac{1}{1-\eta}(t^{1-\eta} - 1) \quad (6)$$

The interesting properties of this curved logarithm are:

$\ln_\eta(1) = 0$ $\frac{\partial \ln_\eta(t)}{\partial t} = \frac{1}{t^\eta} = t^{-\eta}$ $\eta = 1$ leads to the familiar log function.

Figure 2:
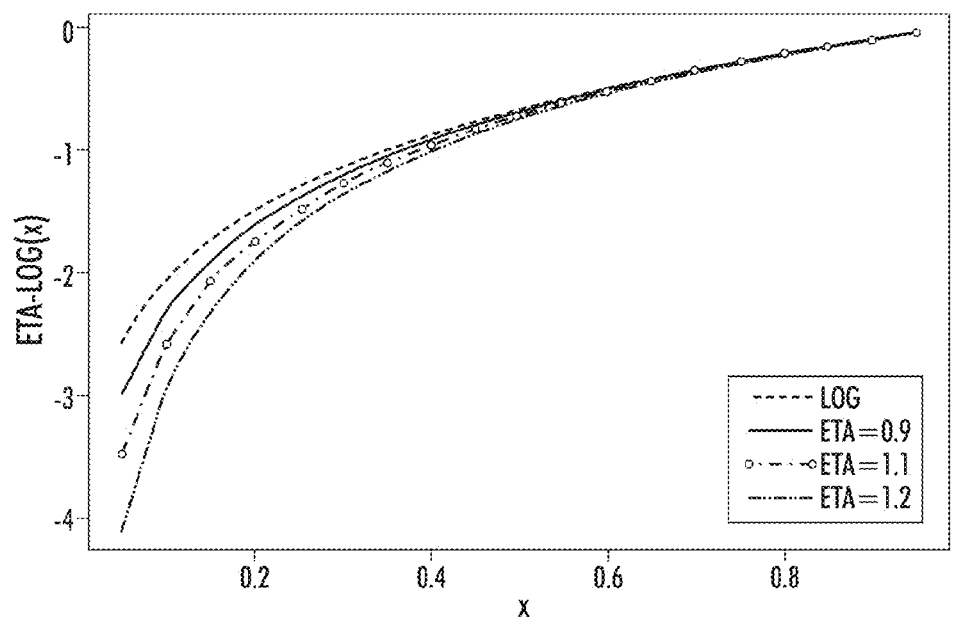
FIG. 2 is a graph of an i'-logarithm illustrating concavity control.

FIG. 2 shows the graph of different $\eta$-logarithms including a concavity control parameter to illustrate how variability of the parameter affects concavity of the function.

The subject embodiments are motivated by the following points. In information retrieval tasks, the concavity in term frequencies of the retrieval function is a critical property of an IR model. For example, concavity favors documents that contain different query terms (i.e. aspects) against documents that contain one query term. A priori, there is no intrinsic reason for the log function to have the best analytical properties in an IR setting. Hence, the point of this generalization is to adjust the concavity of weighting functions. In fact, the $-\log_\eta$ can parameterize a family of concave functions which will lead to better performance.

Although there is gain in expressive power with the introduction of the parameter $\eta$, there is also a loss in the interpretation in terms of probability. With the log function it is possible to write the information measure a document conveys as:

$$-\log P(T^d = (t_{w1}, \ldots, t_{wM})) = -\log \Pi_w P(T_w^d > t_w) = -\Sigma \log P(T_w^d > t_w) \quad (7)$$

Note that the previous equation assumes independence assumptions between different words. With the ft-logarithm, it is not possible anymore to have such interpretation.

One can define a generalized information model of the form:

$$RSV(q,d) = \Sigma_{w \in q \cap d} q_w \ln_\eta P(T_w \geq t_{wd}|\lambda_w) \quad (8)$$

This model, noted QLN, has then two parameters:

c which normalizes the term frequencies $$\left(t_{wd} = x_{wd} \log\left(1 + c\frac{avgl}{l_d}\right)\right)$$

$\eta$ which sets the curvature of the logarithm

The benefit of such model is the ability to play with the curvature of the model in order to assess the role of concavity. Analysis of the model concavity includes an analysis of the weighting function $h = \ln_\eta P(T_w \geq t_{wd}|\lambda_w)$ of this model with a log-logistic distribution.

$$h(t, \lambda, \eta) = -\frac{1}{1-\eta}\left(\left(\frac{\lambda}{\lambda + t_{wd}}\right)^{1-\eta} - 1\right) \quad (9)$$

$$\frac{\partial h}{\partial t} = -\frac{1-\eta}{1-\eta}\left(\frac{\lambda}{\lambda + t_{wd}}\right)^{-\eta}\left(-\frac{1}{(\lambda + t_{wd})^2}\right) \quad (10)$$

$$\frac{\partial h}{\partial t} = \frac{(\lambda + t_{wd})^{\eta - 2}}{\lambda^\eta} \quad (11)$$

$$\frac{\partial^2 h}{\partial t^2} = (\eta - 2)\frac{(\lambda + t_{wd})^{\eta - 3}}{\lambda^\eta} \quad (12)$$

Within this family of IR models, it is possible to get concave models. Heuristic conditions in Information Retrieval suggest that the IR weighting model should be concave in term frequencies. Hence, heuristic conditions suggest that $\eta$ must be inferior than 2. The case where $\eta = 2$ is the case where the model is linear:

$$h = \frac{\lambda + t_{wd}}{\lambda} - 1 \quad (13)$$

Note that whenever η<1, the weighting function h is bounded:

$$h = \frac{1}{1-\eta}\left(1 - \left(\frac{\lambda}{\lambda + t_{wd}}\right)^{1-\eta}\right) \le \frac{1}{1-\eta} \quad (14)$$

Testing has shown that the generalized information model outperforms known baselines. So, changing the curvature of the models allows one to obtain significant improvements over prior known fixed weighting functions (natural log) or ad-hoc classes which do not focus on concavity control.

Latent Semantic Indexing (LSI) [3] computes a Singular Value Decomposition over a term-document matrix in order to find latent topics. It is also an approach to perform document clustering.

For example, several variants of LSI can be tried on the CLEF (define) dataset. The term document matrix is weighted with a TF-IDF baseline, or an informative content with log-logistic distribution as in information models or in accordance with the subject embodiment with the generalized informative content. More formally, the weighted term document matrix $I_{wd}$ is defined as follows:

$$I_{wd} = -\log_\eta P(t_{wd} | \lambda_w) \quad (15)$$

$$t_{wd} = x_{wd}\log\left(1 + c\frac{avgl}{l}\right) \quad (16)$$

$$c = e - 1 (ie\,default\,value\,of\,c) \quad (17)$$

$$P(J = t_{wd} | \lambda_{wd}) = \frac{\lambda_w}{\lambda_w + t_{wd}} (ie\,log-logistic\,distribution) \quad (18)$$

e−1 can be seen as a default value of c since the occurrences of document of average length are not renormalized (i.e. the normalization factor is equal to 1).

Figure 3:
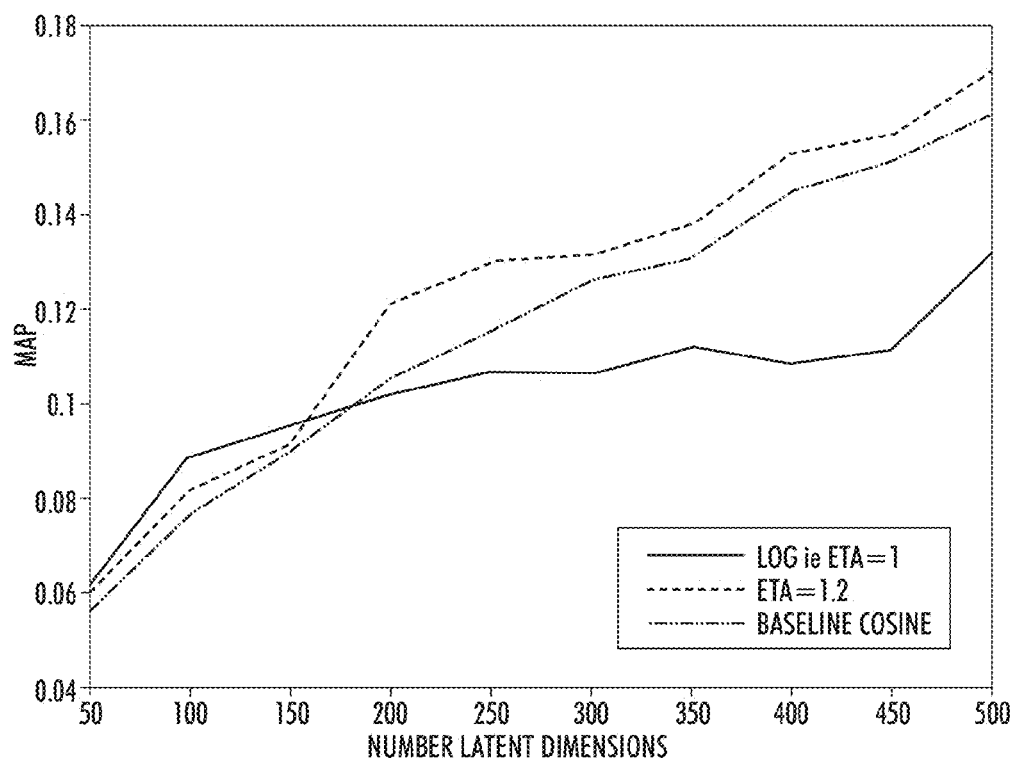
FIG. 3 is a graph showing a Mean Average Precision for dataset queries once the SVD has been performed for several latent dimensions.

FIG. 3 show the Mean Average Precision for the dataset queries once the SVD has been performed for several latent dimensions. This Figure shows that the generalized informative with η=1.2 outperform the two other baselines in most cases. More particularly, it shows on the y-axis a performance measure, against a parameter of the SVD method. Performance improved with the subject embodiment.

Overall, this shows that the proposal is also adequate for computing similarities between documents as better performances are obtained. Many clustering algorithms rely on distance functions between documents. So, this suggests that the subject method would be beneficial for document clustering tasks.

The subject embodiments also can result in improved text classification. The table below illustrates an application to text classification. A logistic regression is trained with L2 regularization with different embedding of term frequencies. For each dataset, the best value of η is kept among {0.5, 0.75, 1, 1.2, 1, 5} and the performance is compared against several TF-IDF weightings and a standard log function. A default value is chosen for c=e−1 and the regularization parameter is chosen on the validation set among {0.0001, 0.01, 0.1, 1, 5, 10, 50, 100}. The Table shows the mean accuracy for 3 standards test collections.

| Weighting Model | φ(d) | 20NewsGroup | Sector | WebKB |
|---|---|---|---|---|
| t fidf L2 norm | $\frac{x_w \text{idf}(w)}{\sqrt{\sum_w (x_w \text{idf}(w))^2}}$ | 87.9 | 87.0 | 81.1 |
| √tfidf L2 norm | $\frac{\sqrt{x_w \text{idf}(w)}}{\sqrt{\sum_w (x_w \text{idf}(w))}}$ | 88.8 | 87.2 | 85.9 |
| Battacharya t f | $\sqrt{\frac{x_w}{\sum_w x_w}}$ | 86.0 | 84.4 | 88.6 |
| log, ie η = 1 | $-\log P(T_w = t_w | \lambda_w)$ | 88.4 | 87.9 | 87.2 |
| Best η | $-\log_\eta P(T_w = t_w | \lambda_w)$ | 89.0 | 89.5 | 88.9 |

The Best η is seen at the bottom row.

Figure 1:
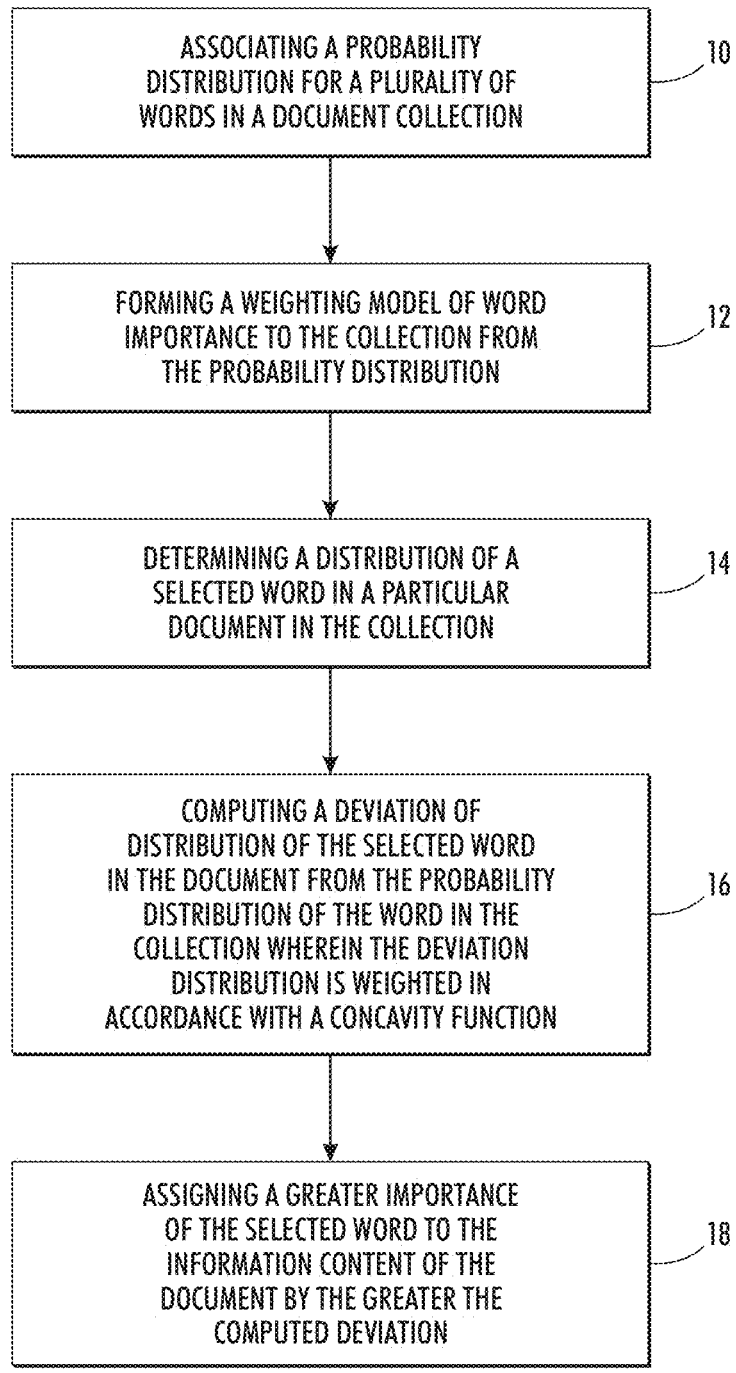
FIG. 1 is flowchart showing steps of a preferred embodiment.

With reference to FIG. 1, a flowchart showing steps of a preferred embodiment is illustrated. Initially, for a plurality of words in a document collection, a probability distribution is associated 10 for them in the collection. A weighting model is then formed 12 of word importance to the collection from the probability distribution. A distribution of a selected word in a particular document in the collection is then determined 14. A deviation of distribution of the select word in the document from the probability distribution of the word in the collection is computed 16 wherein the deviation distribution is weighted in accordance with a concavity function. Lastly, a greater importance of the select word to the informative content of the document can be assigned by the greater the computed deviation 18.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A processing system for representing documents relative to importance of words in the document, including:
a processor comprising a weighting model of word importance of a word w in a document d in a collection relative to an importance of the word w in other documents in the collection by computing a deviation of distribution of the word w from a probability distribution of the word w in other documents in the collection, wherein the deviation distribution is weighted in accordance with a concavity function comprising a selectively variable concavity control parameter η for setting a curvature of a logarithm of the concavity function and wherein the concavity control parameter η is effected relative to a probable frequency of the word w in the document d according to $-\ln_\eta P(T_w \ge t_{wd}|\lambda_w)$ where $T_w$ is a continuous random variable modeling normalized term frequencies for a probability distribution parameterized by a set of parameters $\lambda_w$ and $t_{wd}$ represents frequency of the word w in the document d.

2. The system of claim 1 wherein the weighting model is represented as:

$$RSV(q, d) = \sum_{w \in q \cap d} -q_w \ln_\eta P(T_w \ge t_{wd} | \lambda_w)$$

wherein parameter c normalizes word frequencies for determining the importance of the word wherein $$t_{wd} = x_{wd} \log\left(1 + c\frac{avgl}{ld}\right),$$

and parameter η sets curvature of the logarithm; and,
q represents a query;
RSV(q, d) represents a ranking function representing retrieval status value of document d for query q;
$x_{wd}$ represents number of occurrences of word w in document d;
P(w|C) represents Probability of the word in the collection; and
$q_w$ represents a query for a word.

3. The system of claim 1, wherein the concavity control parameter η is varied in accordance with predetermined standards to better effect text classification or latent semantic indexing.

4. A method for document representation by measuring informative content of words, comprising:
associating a probability distribution P(w|C) for a plurality of words in a document collection C;
forming a weighting model of word importance to the collection from the probability distribution therein;
determining a distribution $t_{wd}$ of a selected word w in a particular document d in the collection;
computing a deviation of the distribution of the selected word w in the document d from the probability distribution P(w|C) of the word w in the collection C in accordance with a concavity function $-\ln_\eta P(T_w \geq t_{wd}|\lambda_w)$ comprising a selectively variable concavity control parameter η for setting a curvature of a logarithm of the concavity function $-\ln_\eta P(T_w \geq t_{wd} - \lambda_w)$ in which the concavity control parameter η is effected relative to a probable frequency of the word w in the document d; and
assigning a greater importance of the selected word w to the informative content of the document d by the greater than computed deviation in accordance with a concavity function $-\ln_\eta P(T_w \geq t_{wd} - \lambda_w)$ whereby the document d can be represented relative to the collection by the assigned importance of a plurality of selected words.

5. The method of claim 4 wherein the concavity control parameter is selectively variable.

6. The method of claim 4 wherein the computing is effected in accordance with:

$$RSV(q, d) = \sum_{w \in q \cap d} -q_w \ln_\eta P(T_w \geq t_{wd} | \lambda_w)$$

wherein $$t_{wd} = x_{wd} \log\left(1 + c\frac{avgl}{ld}\right)$$

parameter c normalizes word frequencies for determining the importance of the word, and parameter η sets curvature of the logarithm and,
q represents a query;
RSV(q, d) represents a ranking function representing a retrieval status value of document d for query q;
$x_{wd}$ represents number of occurrences of word w in document d;
$T_w$ represents Continuous Random Variable for normalized occurrences;
$q_w$ represents a query for a word; and
$\lambda_w$ represents a set of parameters of a preselected probability distribution.

7. The method of claim 4 wherein the concavity control parameter η is varied in accordance with predetermined standards to better effect text classification or latent semantic indexing.

8. A processing system for representing documents relative to importance of words in the document, including:
a processor comprising a weighting model of word importance in a document in a collection relative to an importance of the word in other documents in the collection by computing a deviation of distribution of the word from a probability distribution of the word in other documents in the collection, wherein the deviation distribution is weighted in accordance with a concavity function comprising a selectively variable concavity control parameter η for setting a curvature of an η-logarithm $$\ln_\eta(t) = \frac{1}{1-\eta}(t^{1-\eta} - 1)$$

of the concavity function and wherein the control parameter is effected relative to a probable frequency of the word in the document.

* * * * *